Figure 1:
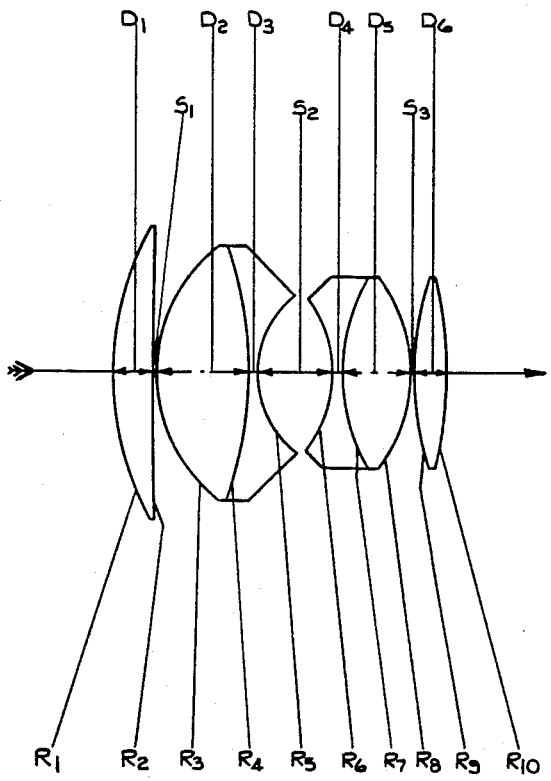

Nov. 23, 1937.  H. W. LEE  2,100,290
LENS
Original Filed June 8, 1935

SPHERICAL SURFACE  $R = 1.267$

ASPHERICAL SURFACE
$Y^2 = 23.132\, X^2 + 2.534\, X$

INVENTOR
Horace William Lee
By Arthur L. Kent
his ATTORNEY.

Patented Nov. 23, 1937

2,100,290

UNITED STATES PATENT OFFICE 2,100,290

LENS

Horace William Lee, Chiswick, England, assignor to Kapella Limited, Leicester, England, a corporation of England Application June 8, 1935, Serial No. 25,563. Renewed May 6, 1937. In Great Britain June 15, 1934

4 Claims. (Cl. 88—57)

This invention relates to lenses of the kind comprising four separate components of which the two exterior components are collective and the two interior ones are dispersive menisci and have their concave exterior surfaces facing one another, and its object is to provide a lens having at the same time a flat field, of substantial angular extent, and a larger aperture than has hitherto been attained therewith.

In lenses of this kind as hitherto constructed the deep curvatures of the exterior surfaces of the components, and particularly those of the dispersive components, have limited the diameters of the components and therewith the aperture of the lens, for to extend the diameters substantially would involve intersection of the surfaces and introduce objectionable zonal aberration. To avoid these difficulties, according to the invention I make the exterior surfaces of the dispersive components substantially shallower than any hitherto employed in lenses of this kind and thereby I am enabled to increase the diameters of the components without introducing serious zonal aberration, and I secure flatness of field by making the dispersive components of sufficient thickness.

As it is impossible, by the use of spherical surfaces only, to complete the correction for spherical aberration of a system so modified, I do so by making one or more of the exterior surfaces of the collective or dispersive components of conicoidal form. Preferably such form is given to one or more of the convex surfaces, and preferably to such surfaces of the collective components.

I prefer to divide the correction by forming two or more surfaces of the system aspherical, preferably one in each half of the system, as such treatment is more favorable for oblique pencils.

It is not always necessary to make the whole of any such surface conicoidal, the axial portion may be spherical and the peripheral portion a conicoid osculating the sphere at some predetermined zone.

The width of the outer conicoidal zone must be at least ten percent of the diameter of the surface in order to be effective.

I shall hereafter refer to the front of the lens system as meaning that half of the lens which is situated on the side of the longer conjugate for which the lens is corrected, and I shall use the term "rear" to denote the half at the other end of the system.

In the term "conicoidal" I shall include both surfaces which are wholly conicoidal and those which are conicoidal only as to their outer zones.

Figure 2:
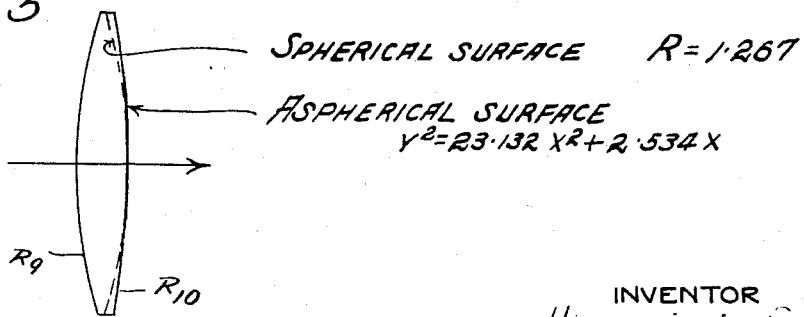

I now give data for the construction of a lens according to my invention, illustrated in the accompanying drawing, in which Fig. 1 is an axial section through the lens as a whole and Fig. 2 is an axial section through the rearmost element of the lens. The notation is that the successive radii of curvature, counting from the front, are called $R_1$, $R_2$, etc., the sign $+$ denoting that the curve is convex toward the incident light, and $-$ that it is concave toward the same. The axial thicknesses of the elements are denoted by $D_1$, $D_2$, etc., and the separations of the components by $S_1$, $S_2$, etc.

The material is defined in terms of the mean refractive index $nD$, as conventionally employed, followed by the Abbe V number and by the type number in Messrs. Chance Brothers' optical glass catalogue.

*Example*

| Aperture f/1.1 | | Equivalent focal length 1" | | | |
|---|---|---|---|---|---|
| Radii | Thickness | Separation | nD | V | No. |
| $R_1 = +.939$ | $D_1 = .12$ | | 1.6105 | 53.3 | 610533 |
| $R_2 = +19.34$ | | $S_1 = .003$ | | | |
| $R_3 = +.502$ | $D_2 = .29$ | | 1.6134 | 59.3 | 613593 |
| $R_4 = -1.18$ | $D_3 = .033$ | | 1.6504 | 33.7 | 650337 |
| $R_5 = +.307$ | | $S_2 = .23$ | | | |
| $R_6 = -.390$ | $D_4 = .033$ | | 1.6504 | 33.7 | 650337 |
| $R_7 = +.600$ | $D_5 = .215$ | | 1.6530 | 46.2 | 653462 |
| $R_8 = -.487$ | | $S_3 = .003$ | | | |
| $R_9 = +.975$ | $D_6 = .083$ | | 1.6530 | 46.2 | 653462 |
| $R_{10} = -1.267$ | | | | | |

A lens made according to the above data with all surfaces spherical is under-corrected for spherical aberration. To complete the correction I may make one or more of the surfaces wholly or partly aspherical, and, for example, make the surface 10 a surface of revolution whose meridianal section has the equation:—

$$y^2 = 23.132x^2 + 2.534x$$

where $x$ is measured in focal lengths from the vertex along the axis away from the focal plane, and $y$ is measured at right angles thereto.

In this example the radius of curvature at any zone in such surface of revolution is in excess of the radius given above for $R_{10}$. As a result, keeping the thickness of the rearmost element constant, the substitution of an aspheric surface corresponding to the above equation for a spherical surface of radius −1.267 involves (in effect) adding glass to such spherical surface. This fact is illustrated in Fig. 2 of the drawing.

Such a lens has considerably less zonal spherical aberration than one made entirely with spherical surfaces.

I prefer to divide the correction by forming aspherical surfaces on two or more surfaces of the system, preferably at opposite ends thereof, as such treatment is more favourable for oblique pencils.

The width of the outer conicoidal zone must be at least ten per cent of the diameter of the surface in order to be effective.

What is claimed is:

1. A lens comprising four separate components of which the two exterior ones are collective and the two interior ones are dispersive menisci and have their concave exterior surfaces facing one another, the outer convex surfaces having radii of curvature at their vertices not less than 0.45 the focal length of the system, the front dispersive component having its exterior concave surface of radius of curvature not less than one-fourth and the rear dispersive component having its exterior concave surface of radius not less than one-third, the focal length of the system, and in which at least one of the exterior surfaces of the components is substantially conicoidal as to its peripheral zone over a width not less than one-tenth the diameter of the surface at any point in its periphery.

2. A lens as claimed in claim 1, in which neither dispersive component has a thickness less than one-fifth the focal length of the system.

3. A lens as claimed in claim 1, in which the conicoidal surface is convex.

4. A lens as claimed in claim 1, in which the conicoidal surface is one of the convex surfaces of the collective components.

HORACE WILLIAM LEE.